(12) United States Patent
Nunes et al.

(10) Patent No.: US 10,701,017 B2
(45) Date of Patent: *Jun. 30, 2020

(54) AUTOMOTIVE WHEEL OVERLAY ATTACHMENT SYSTEM

(71) Applicant: Keystone Automotive Operations, Inc., Exeter, PA (US)

(72) Inventors: Mitchell Nunes, Townsend, TN (US); Kurt Kruse, Brandon, FL (US)

(73) Assignee: Keystone Automotive Industries, Inc., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,251

(22) Filed: Oct. 9, 2018

(65) Prior Publication Data
US 2019/0319907 A1    Oct. 17, 2019

Related U.S. Application Data

(63) Continuation of application No. 15/253,331, filed on Aug. 31, 2016, now Pat. No. 10,116,610.

(51) Int. Cl.
*H04L 12/58*   (2006.01)
*G06Q 10/10*   (2012.01)
(Continued)

(52) U.S. Cl.
CPC ............ *H04L 51/22* (2013.01); *B60B 7/0013* (2013.01); *B60B 7/04* (2013.01); *B60B 7/066* (2013.01); *B60B 7/14* (2013.01); *G06F 3/048* (2013.01); *G06F 3/0482* (2013.01); *G06Q 10/107* (2013.01); *G06T 11/206* (2013.01); *H04L 29/06* (2013.01); *H04L 51/00* (2013.01);

*H04L 51/12* (2013.01); *H04L 51/14* (2013.01); *H04L 51/16* (2013.01); *H04L 51/28* (2013.01);
(Continued)

(58) Field of Classification Search
CPC ......... B60B 7/04; B60B 7/066; B60B 7/0013; B60B 2900/572
USPC ...................................................... 301/37.26
See application file for complete search history.

(56) References Cited

U.S. PATENT DOCUMENTS 1,609,878 A    12/1926   Volney
2,274,496 A    2/1942    Mulhern
(Continued)

FOREIGN PATENT DOCUMENTS

DE              3704384           8/1988

OTHER PUBLICATIONS

Non-Final Office Action for U.S. Appl. No. 14/559,184 dated Feb. 17, 2016.
(Continued)

*Primary Examiner* — S. Joseph Morano
*Assistant Examiner* — Jean W Charleston
(74) *Attorney, Agent, or Firm* — K&L Gates LLP (57) ABSTRACT

A vehicle wheel overlay attachment system disclosed herein provides for wheel overlays, or wheel skins, that are readily installable over existing wheels by securing directly to a wheel center cap. The center cap is adapted to be inserted into the center hub portion of the wheel, much like a traditional center cap, but also contains a system for securing a wheel overlay to the center cap. When properly installed on the center cap, the wheel overlay will be snugly positioned over the wheel thereby changing the appearance of the vehicle wheel.

17 Claims, 6 Drawing Sheets

(51) Int. Cl.
| | |
|---|---|
| *H04L 29/06* | (2006.01) |
| *B60B 7/00* | (2006.01) |
| *B60B 7/14* | (2006.01) |
| *B60B 7/06* | (2006.01) |
| *B60B 7/04* | (2006.01) |
| *H04L 29/12* | (2006.01) |
| *G06T 11/20* | (2006.01) |
| *G06F 3/0482* | (2013.01) |
| *G06F 3/048* | (2013.01) |

(52) U.S. Cl.
CPC .............. *H04L 51/32* (2013.01); *H04L 51/34* (2013.01); *H04L 61/1564* (2013.01); *H04L 65/1069* (2013.01); *H04L 65/4076* (2013.01); *B60B 2360/10* (2013.01); *B60B 2360/32* (2013.01); *B60B 2900/325* (2013.01); *B60B 2900/572* (2013.01); *H04L 51/04* (2013.01)

(56) References Cited

U.S. PATENT DOCUMENTS

| | | | |
|---|---|---|---|
| 2,501,065 A | 3/1950 | Longeway | |
| 2,973,226 A | 2/1961 | Ellies | |
| 3,036,867 A | 5/1962 | George | |
| D197,841 S | 3/1964 | Deaver | |
| D199,055 S | 9/1964 | Schraft | |
| 3,193,049 A | 7/1965 | Wallek | |
| D212,941 S | 12/1968 | Winsen | |
| 3,445,936 A | 5/1969 | Wilkerson | |
| 3,445,939 A * | 5/1969 | Malmquist | F26B 15/00 34/223 |
| 3,517,968 A | 6/1970 | Warren et al. | |
| 3,549,204 A | 12/1970 | Spisak | |
| 3,570,093 A | 3/1971 | Gollwitzer | |
| 3,726,566 A | 4/1973 | Beith | |
| 3,746,397 A | 7/1973 | Buerger | |
| 3,851,923 A | 12/1974 | Beisch | |
| 3,868,147 A | 2/1975 | Beisch | |
| 3,894,775 A | 7/1975 | Christophe et al. | |
| 3,999,268 A | 12/1976 | Jacobs | |
| 4,004,837 A | 1/1977 | Main | |
| 4,012,078 A | 3/1977 | Meyers | |
| 4,406,489 A | 9/1983 | Trabert | |
| 4,526,905 A | 7/1985 | Lucast et al. | |
| 4,606,582 A | 8/1986 | Warren | |
| 4,654,778 A | 3/1987 | Chiesa et al. | |
| 4,761,040 A | 8/1988 | Johnson | |
| D302,264 S | 7/1989 | Soederberg | |
| 4,881,783 A | 11/1989 | Campbell | |
| 4,966,245 A | 10/1990 | Pfister | |
| 5,031,965 A | 7/1991 | Buerger | |
| 5,150,949 A | 9/1992 | Wang | |
| 5,297,854 A | 3/1994 | Nielsen et al. | |
| 5,340,201 A | 8/1994 | Weirs | |
| D350,523 S | 9/1994 | Mobius | |
| 5,347,690 A | 9/1994 | Walter | |
| 5,366,278 A | 11/1994 | Bumfield | |
| 5,368,370 A | 11/1994 | Beam | |
| RE34,907 E | 4/1995 | Gross | |
| 5,457,886 A | 10/1995 | Fuller | |
| D374,646 S | 10/1996 | Abbott | |
| 5,577,809 A | 11/1996 | Chase | |
| 5,639,146 A | 6/1997 | Chiu | |
| 5,639,149 A | 6/1997 | Grassmuck | |
| D384,024 S | 9/1997 | Roesianto | |
| D384,026 S | 9/1997 | Chrysanto | |
| D389,112 S | 1/1998 | Chung | |
| D391,913 S | 3/1998 | Chung | |
| 5,795,035 A | 6/1998 | Fuller | |
| 5,803,552 A | 9/1998 | Kato et al. | |
| 5,829,843 A | 11/1998 | Eikhoff | |
| 5,842,749 A | 12/1998 | DiMarco | |
| 5,845,973 A | 12/1998 | Chase | |
| 6,010,196 A | 1/2000 | Wang | |
| 6,012,761 A | 1/2000 | Hellhake et al. | |
| 6,022,057 A | 2/2000 | Vermeulen | |
| 6,022,081 A | 2/2000 | Hauler et al. | |
| 6,027,150 A | 2/2000 | Flewitt et al. | |
| 6,041,878 A | 5/2000 | Daniels et al. | |
| 6,068,346 A | 5/2000 | Pender | |
| 6,068,350 A | 5/2000 | Baumgarten | |
| 6,070,947 A | 6/2000 | Hoyle, Jr. | |
| 6,167,645 B1 | 1/2001 | Gasko et al. | |
| 6,206,438 B1 | 3/2001 | Pueyo | |
| 6,230,832 B1 | 3/2001 | Mayenburg et al. | |
| 6,238,007 B1 | 5/2001 | Wieczorek et al. | |
| 6,247,760 B1 | 6/2001 | Kinoshita | |
| D445,750 S | 7/2001 | Nunes et al. | |
| 6,287,672 B1 | 9/2001 | Fields et al. | |
| 6,302,494 B1 | 10/2001 | DiMarco et al. | |
| 6,402,253 B1 | 6/2002 | Nunes et al. | |
| 6,402,254 B1 | 6/2002 | Eikhoff et al. | |
| 6,405,819 B1 | 6/2002 | Ohkura et al. | |
| 6,409,277 B2 | 6/2002 | Nunes et al. | |
| 6,419,327 B1 | 7/2002 | Renshaw | |
| 6,422,643 B1 | 7/2002 | Pease | |
| 6,450,582 B2 | 9/2002 | Ichikawa et al. | |
| 6,457,781 B1 | 10/2002 | Cutcher et al. | |
| 6,517,168 B1 | 2/2003 | Van Houten | |
| 6,517,968 B2 | 2/2003 | Johnson et al. | |
| 6,527,317 B2 | 3/2003 | Fox et al. | |
| 6,585,330 B2 | 7/2003 | Bruce | |
| 6,637,832 B2 | 10/2003 | Wrase et al. | |
| 6,663,189 B2 | 12/2003 | Enomoto et al. | |
| 6,672,676 B2 | 1/2004 | Zaniboni | |
| 6,672,678 B1 | 1/2004 | Nunes | |
| 6,702,343 B1 | 3/2004 | Stull | |
| 6,752,469 B1 | 6/2004 | Cutcher et al. | |
| D492,624 S | 7/2004 | Elwell et al. | |
| D492,625 S | 7/2004 | Elwell et al. | |
| D492,920 S | 7/2004 | Elwell et al. | |
| 6,757,998 B1 | 7/2004 | Lucatorto | |
| D497,333 S | 10/2004 | Elwell | |
| D497,334 S | 10/2004 | Elwell et al. | |
| D500,266 S | 12/2004 | Elwell | |
| D500,267 S | 12/2004 | Elwell et al. | |
| 6,854,545 B1 | 2/2005 | Elwell et al. | |
| 6,860,568 B2 | 3/2005 | Nunes | |
| 6,957,837 B2 | 10/2005 | Stull | |
| 7,073,849 B1 | 7/2006 | Nunes | |
| 7,100,973 B2 | 9/2006 | Aigner | |
| 7,108,334 B2 | 9/2006 | Bruce | |
| 7,131,705 B1 | 11/2006 | DelVecchio et al. | |
| 7,152,915 B2 | 12/2006 | Diehl et al. | |
| 7,204,562 B2 | 4/2007 | Gerard | |
| D546,247 S | 7/2007 | Abbett | |
| 7,246,832 B2 | 7/2007 | Cobble et al. | |
| 7,300,116 B2 | 11/2007 | Bruce et al. | |
| 7,311,352 B2 | 12/2007 | Flotzinger | |
| 7,314,245 B1 | 1/2008 | Shymkiw | |
| 7,325,864 B1 | 2/2008 | Echeverria | |
| 7,354,082 B2 | 4/2008 | Sakamoto | |
| 7,374,249 B2 | 5/2008 | Wilmer | |
| 7,416,260 B1 | 8/2008 | Cuevas et al. | |
| 7,435,045 B2 * | 10/2008 | Wilson | F16B 37/14 411/375 |
| 7,452,037 B1 * | 11/2008 | Nunes | B60B 7/08 301/37.102 |
| 7,510,248 B2 | 3/2009 | Wang | |
| 7,537,253 B2 | 3/2009 | Rosen et al. | |
| 7,541,248 B2 | 3/2009 | Wang | |
| 7,553,552 B2 | 6/2009 | Oba et al. | |
| 7,562,939 B2 | 6/2009 | Zanin | |
| 7,651,171 B2 | 1/2010 | Kinslow et al. | |
| 7,766,111 B2 | 8/2010 | Guilfoyle et al. | |
| 7,784,576 B2 | 8/2010 | Guilfoyle et al. | |
| 7,784,877 B1 * | 8/2010 | Castillo | B60B 7/04 301/37.104 |
| 7,896,409 B2 | 3/2011 | Abdelnour et al. | |
| 7,921,563 B2 | 4/2011 | Doroghazi | |
| 7,997,663 B2 | 8/2011 | Zaniboni | |
| 8,020,905 B2 | 9/2011 | Nakayama | |
| 8,070,195 B2 | 12/2011 | Li-Yueh et al. | |

(56) References Cited

U.S. PATENT DOCUMENTS

| | | | |
|---|---|---|---|
| D655,226 S | 3/2012 | Hansen | |
| 8,342,613 B2 | 1/2013 | Russell | |
| 8,382,211 B2 | 2/2013 | Renius et al. | |
| 8,864,242 B2 | 10/2014 | Mengle et al. | |
| 9,327,550 B2 | 5/2016 | Butler et al. | |
| 9,398,833 B2 | 7/2016 | Vickers et al. | |
| 9,409,441 B2 | 8/2016 | Mayer Pujadas et al. | |
| 9,821,599 B2 | 11/2017 | Wang | |
| 2004/0095013 A1 | 5/2004 | Gerard | |
| 2005/0073191 A1 | 4/2005 | Gerard | |
| 2005/0231024 A1 | 10/2005 | Wang | |
| 2006/0095178 A1 | 5/2006 | Guilfoyle et al. | |
| 2009/0278398 A1* | 11/2009 | Diko | B60B 7/14 |
| | | | 301/37.102 |
| 2013/0076105 A1 | 3/2013 | Hung | |
| 2014/0152079 A1 | 6/2014 | Vickers et al. | |
| 2014/0265532 A1 | 9/2014 | Pujadas et al. | |
| 2014/0265535 A1 | 9/2014 | Stratton et al. | |
| 2015/0042149 A1 | 2/2015 | Wang | |
| 2015/0224819 A1 | 8/2015 | Hussmann | |

OTHER PUBLICATIONS

Final Office Action for U.S. Appl. No. 14/559,184 dated Jul. 26, 2016.

Final Office Action for U.S. Appl. No. 14/559,184 dated Jul. 26, 2017.

Non-Final Office Action for U.S. Appl. No. 14/559,184 dated Sep. 13, 2017.

Non-Final Office Action for U.S. Appl. No. 14/559,184 dated Nov. 14, 2016.

Trenz Grilles, Stylinconcepts Sports Truck Accessories Catalog from on or before Jul. 17, 2004.

Omix-Ada, Inc. catalog, p. 26, downloaded from http://www.icebear.no/jeep/omixkatalog_2003.pdf, Spring 2003, part 1, pp. 1-80.

Omix-Ada, Inc. catalog, downloaded from http://www.icebear.no/jeep/omixkatalog_2003.pdf, Spring 2003, part 2, pp. 82-160.

Omix-Ada, Inc. catalog, "Welcome to Our New Jeep® Catalog With 100's of New Items," p. 32, downloaded from http://theusedjeep.com/pdf/56k3.pdf, Sep. 2004.

http://www.cruisermotorsports.com/Grilles.html (Jan. 9, 2004) AutoTechnica Chrome Grill Overlay for sale.

http://www.autotrucktoys.com/ptcruiser/Autotecnica-Chrysler-PT-Cruiser-Chrome-Grille-Overlay-PRD12551.aspx (AutoTechnica Chrome Grill Overlay for sale).

http://www.raceandstreet.com/Merchant2/merchant.mvc?Screen=PROD&Store_Code=RAS&Product_Code=970027&Category_Code=E-G (2008) AutoTechnica Chrome Grill Overlay for sale.

http://www.autoamenity.com/Chrome-Griii/Chrome-Grill-Inserts.htm (Oct. 30, 2005)

2001 Chrysler PT Cruiser (Dec. 12, 2000) http://www.chrysler.com/pt-cruiser/ext/feature4.html.

US 6,755,485, 6/1995, Chase (withdrawn)

\* cited by examiner

AUTOMOTIVE WHEEL OVERLAY ATTACHMENT SYSTEM

PRIORITY CLAIM

This application is a continuation of U.S. application Ser. No. 15/253,331 filed Aug. 31, 2016, the entire contents of which are incorporated herein by reference.

DESCRIPTION

The present disclosure relates to wheel overlays for automotive and other vehicle wheels and more specifically to functional and aesthetic improvements to known overlays for automotive and other vehicle wheels.

BACKGROUND

Known wheel overlays are deficient in that they do not provide efficient or effective fastening to the underlying wheel of an automobile or other vehicle. Wheel overlays are also sometimes referred to as wheel skins. Specifically, known wheel overlays do not provide fastening mechanisms that are easily attachable, do not provide fastening mechanisms that are easily removable, and do not rely on aesthetically pleasing clips or fastening members. Also, known overlays are not compatible with multiple toolings of the same wheel and the variances of those wheels since aesthetically, the wheels are the same but there can be slight differences in certain dimensions that impact the ability for the wheel overlay to attach to the wheel. What is needed is a wheel overlay system that satisfies these and other deficiencies of known automotive or other vehicle wheel overlay systems.

Simulated chrome plated wheel covers designed to be installed over standard factory wheels are known. For example, U.S. Pat. Nos. 6,010,196, 6,402,253, 6,409,277, and 6,672,678 disclose embodiments of simulated chrome plated wheel covers or overlays that rely on fasteners arranged around the outside of the wheel to affix the cover to the wheel. In some of these embodiments, the described fasteners rely on an upward extending circumferential edge on the vehicle wheel to which the fasteners may be removably affixed. Typically the wheels to which such overlays are affixed are made of steel. In these embodiments, the wheel covers would either completely cover the lug nuts, or they would have openings corresponding to the positions of the lug nuts to enable access to the lug nuts (e.g., to allow the wheel to be removed) without taking the cover off. In these embodiments, if the wheel to which the overlay is going to be affixed lacks an upward extending circumferential edge, the known cover attachment mechanisms cannot be used. These known fasteners are also not aesthetically pleasing, as they are visible on the outer rim of the wheel cover and thus disrupt the aesthetic appearance of the wheel/overlay combination.

Aluminum alloy wheels presented a different challenge for simulated wheel covers because the wheels often use spokes and do not typically have a recessed outer rim. U.S. Pat. No. 7,452,037 shows a wheel cover that may be attached to an alloy wheel by duplicating the shape of the original wheel on the interior and acting as a skin. Fasteners are generally not used to affix wheel covers to alloy wheels; instead the wheel contains slots that are used for inserting studs attached to the wheel cover. The cover substantially duplicates the entire outer surface of the wheel, however the sides of the spokes have a slight minimal gap or offset. This gap is only the width of a slot or slots provided within each spoke. When the wheel cover is placed over the wheel, a mating mushroom head stud, which may be integrally formed into the wheel overlay, is aligned with one edge of the slot and is easily inserted onto an area of the slot slightly larger than the diameter of the stud. The wheel cover is then rotated clockwise until the stud snaps into place in a smaller area of the slot, thereby changing the gap from one side of the spoke to the other. These covers may either cover the hub completely or match the contour of the hub, thereby permitting the lug nuts to be exposed for easy removal of the wheel.

Creating wheel overlays that appear to be part of the wheel when mounted to the wheel presented a challenge as well. U.S. application Ser. No. 14/559,184, assigned to the assignee of the instant application, shows a vehicle wheel overlay system that is readily installable over existing wheels by attaching directly to lug nuts, studs, or other mounting hardware used to affix the wheel itself to the body of the vehicle. The overlay system provides for a wheel overlay that can be readily removed by disengaging lips of the extension(s) of the wheel overlay from the lug nuts holding the wheel to the vehicle, thus providing easy access to the lug nuts and enabling the wheel to be easily removed from the vehicle. In some embodiments, the plurality of lug nut engaging areas for engaging with and disengaging from a corresponding extension may be designed from various shapes, including but not limited to: rounded, angled and wedge-shaped.

While this wheel overlay system represents an improvement over prior, known systems, additional improvements have nonetheless developed. The most recent challenge, which is addressed by the instant disclosure, relates to using a center cap assembly as part of the attachment mechanism. A center cap assembly may be used to securely attach a wheel overlay a wheel. In addition, there is a desire to use the original center cap so that the wheel overlay appears to be part of the original wheel. There is also a need to use multiple attachment mechanisms together to ensure the wheel overlay is securely attached to the wheel. The instant disclosure satisfies these and other problems not previously solved in the prior art.

SUMMARY

Various embodiments of the vehicle wheel overlay system disclosed herein provide for wheel overlays that are readily installable over existing wheels by attaching directly to a center cap assembly. The center cap assembly is adapted to be inserted into the center hub of the wheel, much like a traditional center cap, but also contains a mechanism or assembly for securing a wheel overlay to the center cap. When the wheel overlay is properly installed using the center cap assembly, the wheel overlay will be snugly positioned over the wheel without the drawbacks of traditional methods for affixing a wheel overlay to a wheel known in the art. The center cap assembly thus improves on prior known affixing mechanisms by ensuring that mounting forces are applied circumferentially around the wheel, as well as at the center of the wheel.

Additionally, the wheel overlay disclosed herein may have an aesthetically pleasing finish, such as a chrome plated finish or a painted finish of a different color, to add to the aesthetic appearance of the vehicle. In some embodiments, the disclosed wheel overlays are unfinished, or in a raw form, so that the consumer or an aftermarket paint specialist may paint the overlays any color or pattern desired.

The instant disclosure also advantageously provides for wheel overlays that may be used on both steel and alloy wheels since both types of wheels may be (and typically are) designed with the inclusion of a center cap used to cover the wheel hub. Moreover, since the center cap design in some embodiments does not depend on whether steel or alloy wheels are being affixed to a vehicle, the fastening mechanism for wheel overlays may be the same regardless of the material from which the wheel is constructed.

Furthermore, since wheels may vary in diameter, number of lugs nut, lug nut spacing, and outer rim design, it is advantageous to have a wheel overlay attachment system which may be readily adapted to be used with various overlay designs. An attachment system which depends on the center cap structure may be uniform in design even when other dimensions of the wheel vary, and thus provides a distinct advantage over known art.

In one embodiment, the disclosed vehicle wheel overlay attachment system includes a fastening structure corresponding to the center cap of the wheel the user wishes to be covered by the wheel overlay. In some embodiments, this wheel will include the original equipment manufacturer ("OEM") wheel. The center cap assembly contains a system for securing the wheel overlay system to the center cap, such that the wheel overlay system is positioned over the vehicle wheel. In some embodiments, the center cap assembly will allow a second center cap to be affixed over the center cap. In one example, a user may attach a wheel overlay and wish to retain the look of the OEM center cap. This embodiment of the center cap assembly allows the user to affix both the wheel overlay and a second center cap to the wheel, the second center cap in this case being an OEM center cap.

The wheel overlays disclosed herein may also contain other mechanisms for securing a wheel overlay. For example, a wheel overlay may be designed for a wheel operating in an extreme environment, such as off road, or to contain an especially complicated design. In such embodiments additional fastening systems to attach the wheel overlay may be necessary. Thus, a wheel overlay may be configured to contain both a center cap assembly and another attachment systems or techniques known in the art.

Additional features and advantages are described herein, and will be apparent from the following Detailed Description and the figures.

DETAILED DESCRIPTION

In general, the vehicle wheel overlay systems disclosed herein affix to a vehicle wheel by using a center cap assembly. A center cap assembly may be configured to affix the vehicle wheel overlay to a vehicle wheel by engaging both the vehicle wheel at the center hub, and the vehicle wheel overlay. By engaging a vehicle wheel at the center hub, the wheel overlay may mirror the shape and appearance of an underlying wheel, while altering its outwardly visible finish, but such that an installed vehicle wheel overlay provides the appearance that no overlay is present at all.

In various embodiments, the center cap assembly may be shaped to engage and mate with any underlying wheel. The center cap assembly may be configured to include any number of components to perform such engagement.

Figure 1A:
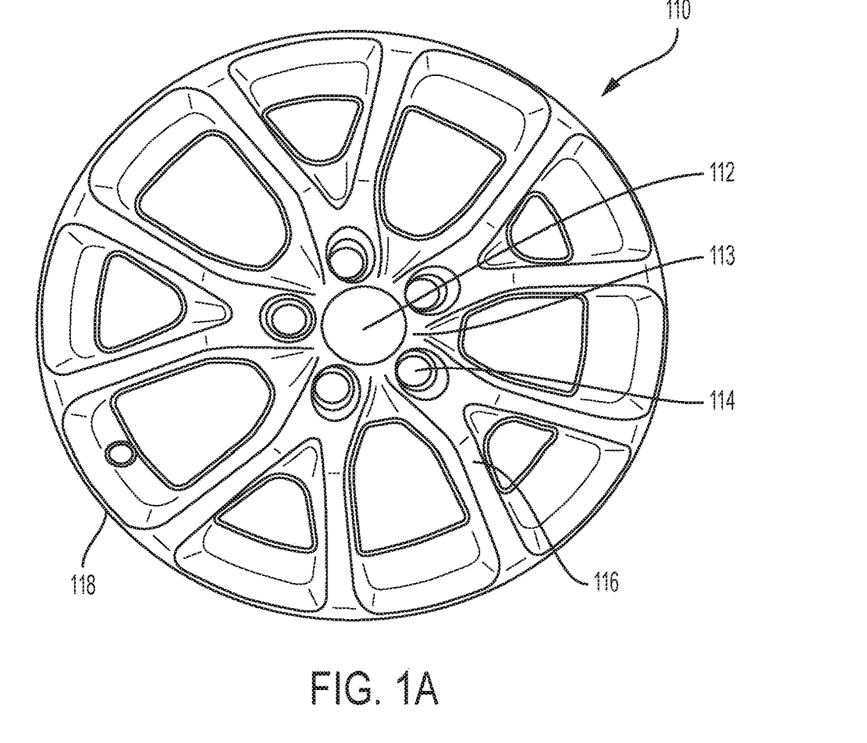
FIG. 1A is a view of a front face of an example vehicle wheel, according to an example embodiment of the present disclosure.

FIG. 1A is a front view of an example vehicle wheel, according to an example embodiment of the present disclosure. A vehicle wheel 110 may include a center recess 112, a plurality of lug nut housings 114, and at least one wheel spoke 116. The plurality of lug nut housings 114 are radially spaced about a perimeter 113 of the center recess 112. In an example embodiment, the vehicle wheel 110 may include five lug nut housings 114. The vehicle wheel 110 may also include an outer edge 118. In an example embodiment, the at least one wheel spoke 116 extends from the center recess 112 to the outer edge 118 of the vehicle wheel 110.

Figure 1B:
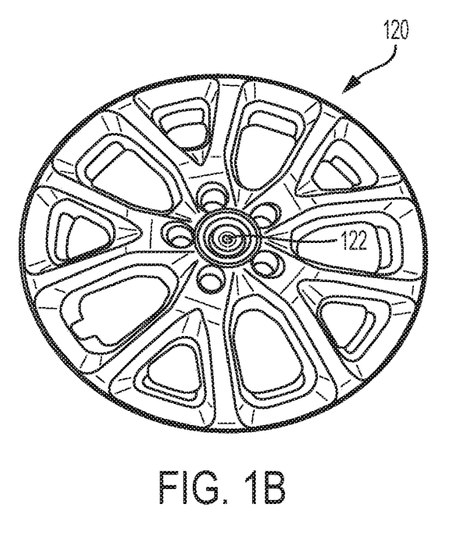
FIG. 1B is a front view of an example wheel overlay, according to an example embodiment of the present disclosure.

FIG. 1B is a front view of an example vehicle wheel overlay 120, according to an example embodiment of the present disclosure. The vehicle wheel overlay 120 may have a shape corresponding to a shape of the vehicle wheel 110 as shown in FIG. 1A. The vehicle wheel overlay 120 may also have a center recess 122 where a center cap may be inserted. The vehicle wheel overlay 120 may be formed of plastic, polycarbonate, metal, acrylic, or any other suitable material depending on the aesthetic and durability requirements of the overlay.

Figure 1C:
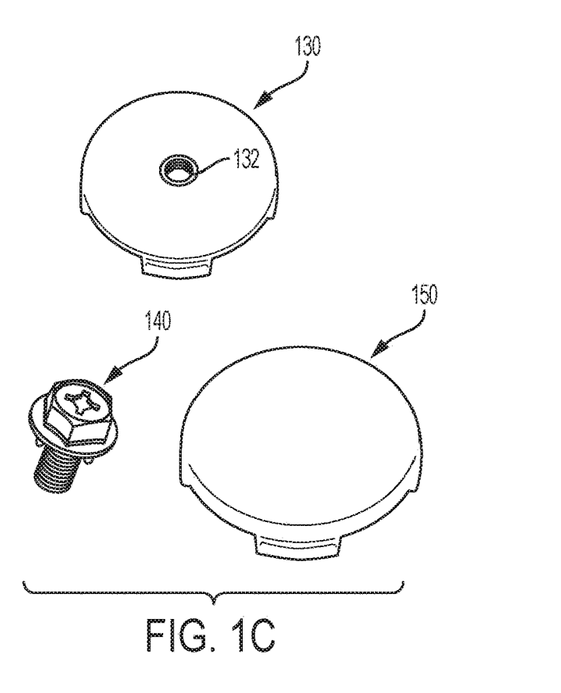
FIG. 1C is an exploded view of the components of an example center cap assembly, according to an example embodiment of the present disclosure.

FIG. 1C an enlarged view of hardware associated with a wheel overlay attachment system, according to an example embodiment of the present disclosure. Hardware associated with a wheel overlay attachment system may comprise a center cap 130, a mechanism 140 for securing the wheel overlay, and a center cap 150 in the present embodiment.

The center cap 130 may have threads 132 in the center for a mechanism 140 to thread into. The center cap 130 may be inserted into the vehicle wheel 110 inside the center recess 112 as shown in FIG. 1A. The mechanism 140 may be selected from the group comprising: an adhesive strip, a magnet, a screw, a rivet, a bolt, and a clip engaging a portion of the wheel. The mechanism 140 may be formed of plastic, polycarbonate, metal, acrylic, or any other suitable material depending on the aesthetic and durability requirements of the mechanism 140. The center cap 150 may be formed of plastic, polycarbonate, metal, acrylic, or any other suitable material depending on the aesthetic and durability requirements of the center cap. The center cap 150 may be an OEM center cap. Alternatively, the center cap 150 may be a different or aftermarket center cap. The center cap 150 may contain a mechanism for irremovably securing the center cap 150 to a vehicle wheel 110 center recess 112 as shown in FIG. 1A.

Figure 2:
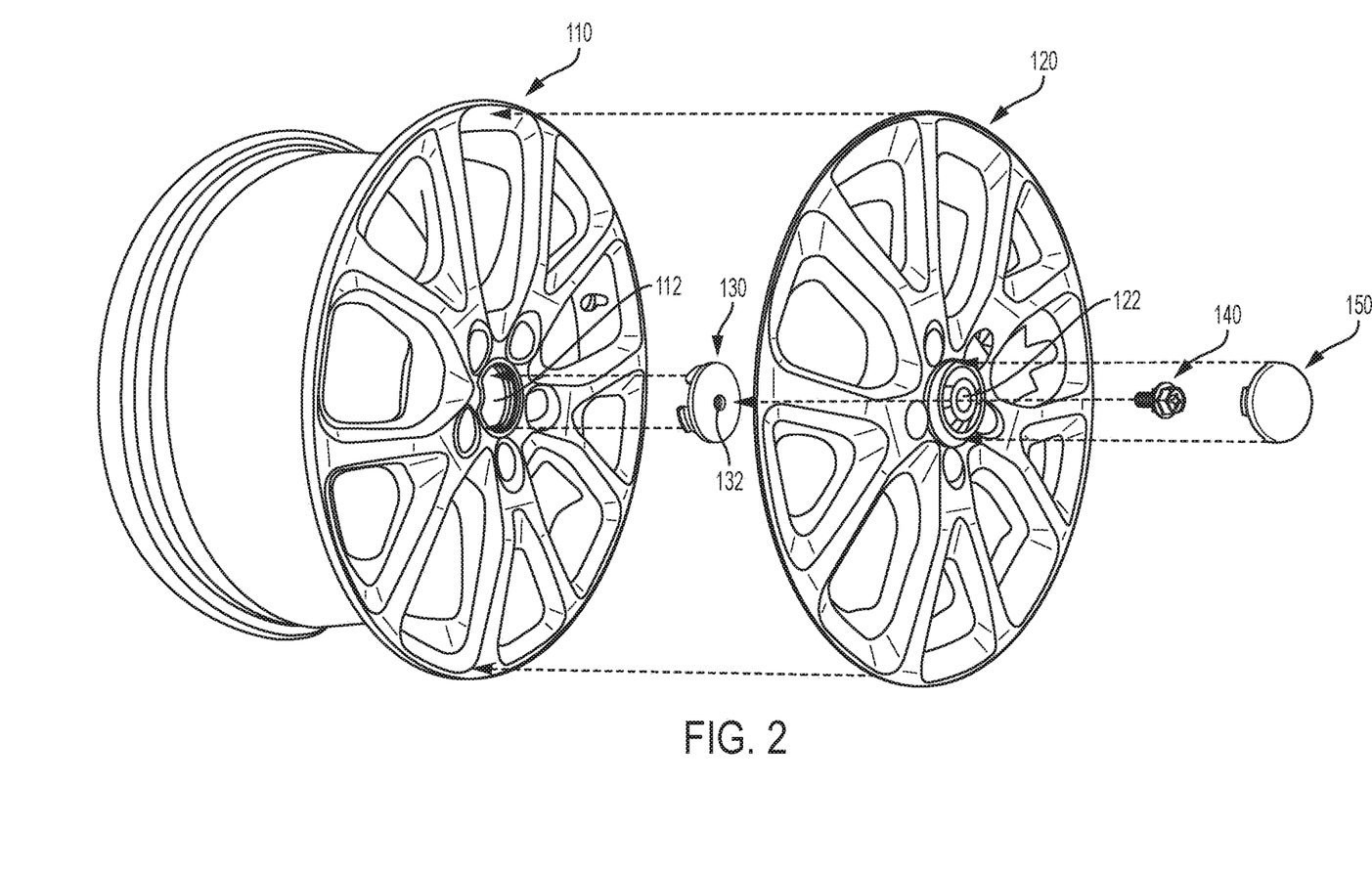
FIG. 2 is an exploded view of how an example wheel overlay with a center cap assembly is put together and placed on an example vehicle wheel, according to an example embodiment of the present disclosure.

FIG. 2 is an exploded view of how an example wheel overlay attachment system is put together and placed on an example vehicle wheel, according to an example embodiment of the present disclosure. The vehicle wheel overlay 120 may be placed over the vehicle wheel 110. For example, the vehicle wheel overlay 120 may have a shape corresponding to the shape of the vehicle wheel 110, which advantageously allows the vehicle wheel overlay 120 to form a tight fit with the vehicle wheel 110. Next, a mechanism 140 for securing the wheel overlay 120 may be affixed to the center cap 130. In this embodiment, the mechanism 140 is a bolt and it is screwed into threads 132 on center cap 130. Then, the center cap 150, which may be an OEM center cap like in this embodiment, may be inserted into the vehicle wheel overlay 120 inside the center recess 122, thus covering the center cap 130 and mechanism 140.

Figure 3A:
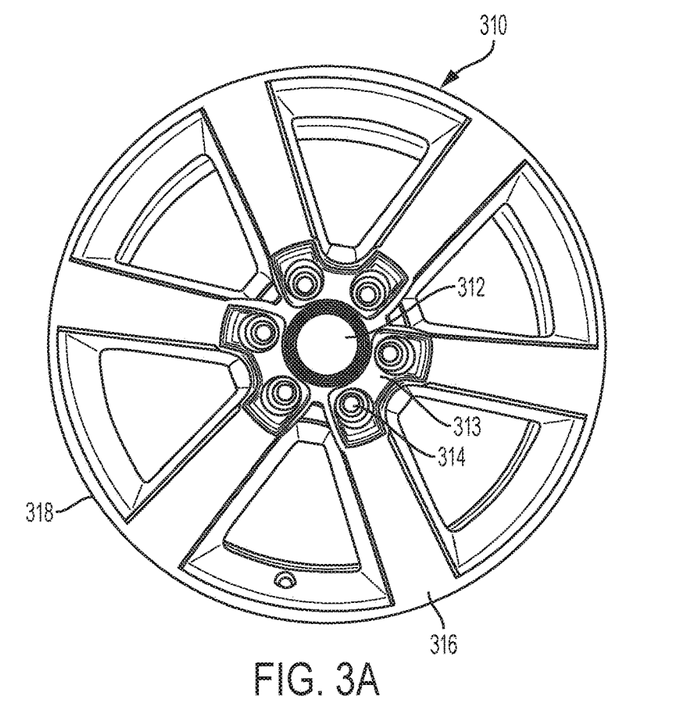
FIG. 3A is a view of a front face of an example vehicle wheel, according to an example embodiment of the present disclosure.

FIG. 3A is a view of a front face of an example vehicle wheel 310, according to an example embodiment of the present disclosure. The vehicle wheel 310 may include a center recess 312, a plurality of lug nut housings 314, and at least one wheel spoke 316. The plurality of lug nut housings 314 are radially spaced about a perimeter 313 of the center recess 312. In an example embodiment, the vehicle wheel 310 may include six lug nut housings 314. The vehicle wheel 310 may also include an outer edge 318. In an example embodiment, at least one wheel spoke 316 extends from the center recess 312 to the outer edge 318 of the vehicle wheel 310.

Figure 3B:
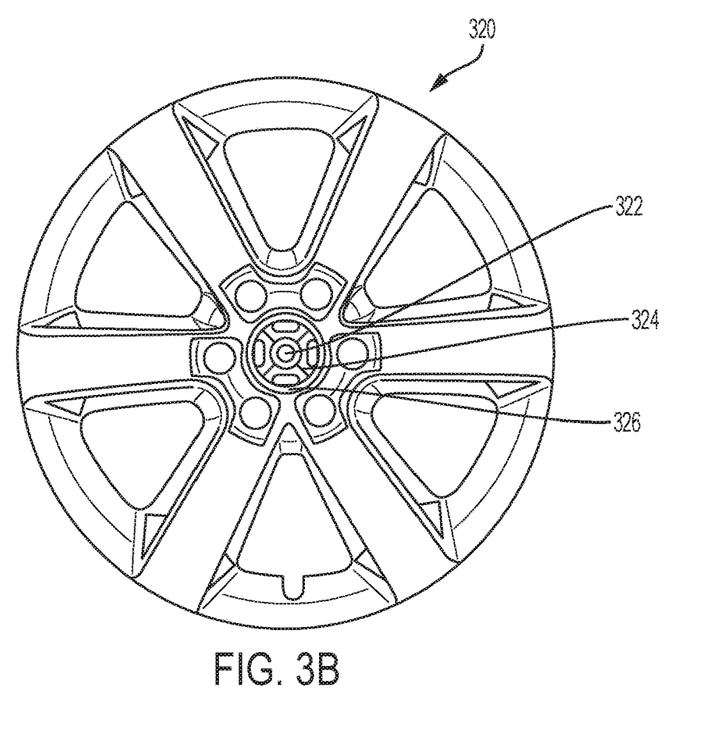
FIG. 3B is a front view of an example wheel overlay, according to an example embodiment of the present disclosure.

FIG. 3B is a front view of an example vehicle wheel overlay 320, according to an example embodiment of the present disclosure. The vehicle wheel overlay 320 may have a shape corresponding to a shape of the vehicle wheel 310 as shown in FIG. 3A. The vehicle wheel overlay 320 may also have a center hole 322 where a bolt may be inserted through. The vehicle wheel overlay 320 may also have a center hub 324 that can be used to hold a washer in place. The vehicle wheel overlay 320 also may have a recessed center 326 where a center cap may be inserted. The vehicle wheel overlay 320 may be formed of plastic, polycarbonate, metal, acrylic, or any other suitable material depending on the aesthetic and durability requirements of the overlay.

Figure 3C:
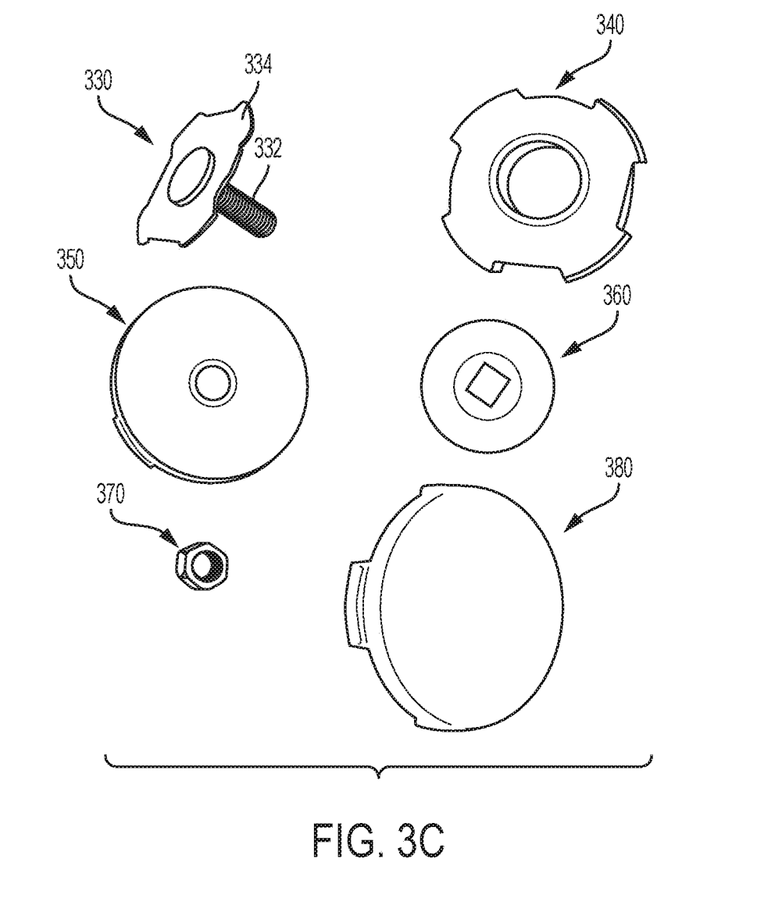
FIG. 3C is an exploded view of the components of a center cap assembly including an original center cap, according to an example embodiment of the present disclosure.

FIG. 3C is an enlarged view of hardware associated with a wheel overlay attachment system, according to an example embodiment of the present disclosure. The mechanism for securing a wheel overlay attachment mechanism may comprise a washer bolt 330, a tension washer 340, a center cap 350, a washer 360, a nut 370, and a center cap 380 in the present embodiment. A washer bolt 330 may contain a bolt 332 and a washer 334. A tension washer 340 may be made from a compressible material, such as but not limited to rubber, and may be configured such that the tension washer 340 expands when it is inserted into the center recess 312 of the vehicle wheel 310 to provide tension against the center recess 312. A center cap 350 may be inserted into a vehicle wheel 310 inside the center recess 312. A nut 370 may be configured to engage the bolt 332 of the washer bolt 330 with washer 360 between the nut 370 and the vehicle wheel overlay 320. A center cap 380 may be inserted into a vehicle wheel overlay 320 inside the center recess 326. The center cap 380 may be an OEM center cap. Alternatively, the center cap 380 may be an aftermarket center cap.

Figure 3D:
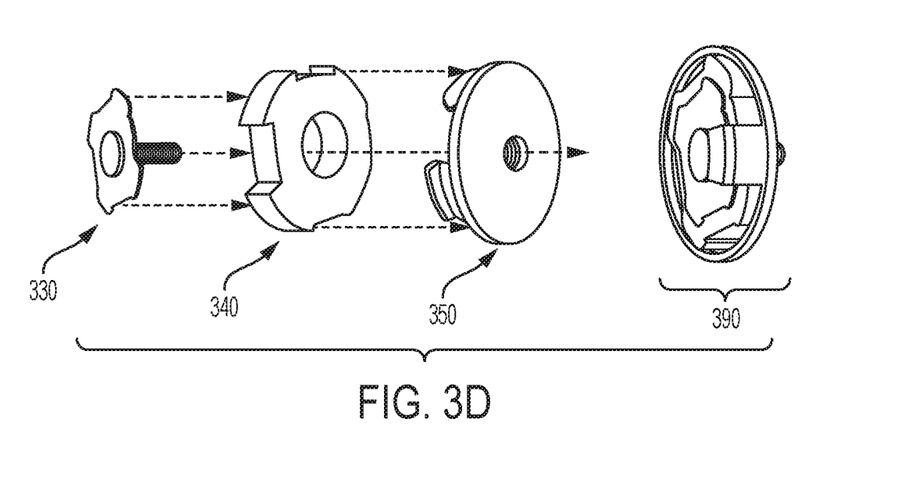
FIG. 3D is an exploded view of how an example center cap assembly is put together, according to an example embodiment of the present disclosure.

FIG. 3D is an exploded view of an example of how the hardware can be combined to make a center cap assembly 390. To assemble the center cap assembly 390, first the washer bolt 330 may be inserted through the tension washer 340. Next, the washer bolt 330 may be inserted through the center cap 350. The washer bolt 330, tension washer 340, and a center cap 350 in combination comprise an example center cap assembly 390.

Figure 4:
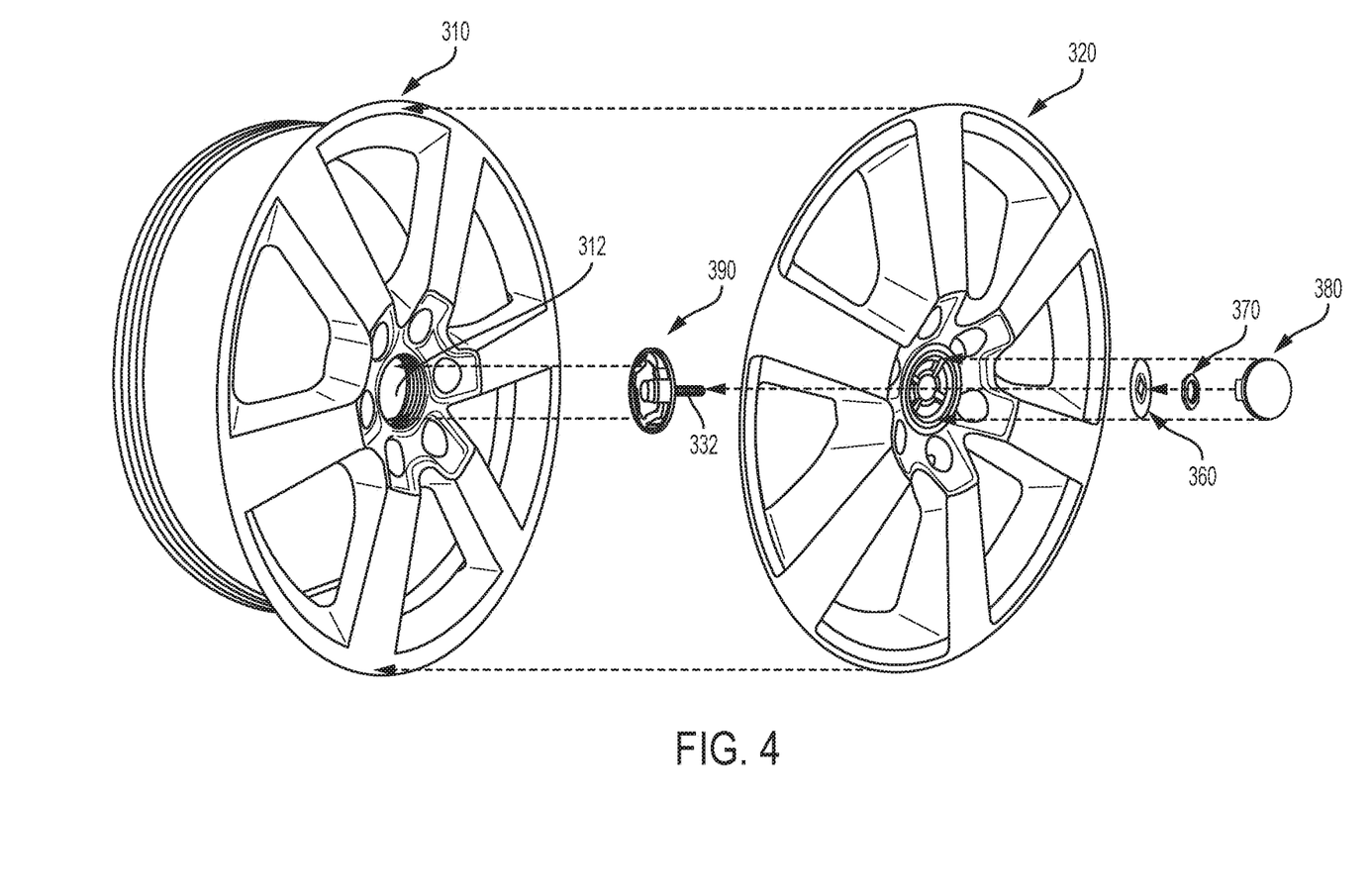
FIG. 4 is an exploded view of how an example wheel overlay with a center cap assembly including an original center cap is put together and placed on an example vehicle wheel, according to an example embodiment of the present disclosure.

FIG. 4 is an exploded view of how an example wheel overlay with a center cap assembly including an original center cap is put together and placed on an example vehicle wheel, according to an example embodiment of the present disclosure. First, the center cap assembly 390 is placed in the center recess 312 in the vehicle wheel 310 as illustrated in FIG. 4. Then the vehicle wheel overlay 320 corresponding to this embodiment of the vehicle wheel 310 may be placed over the vehicle wheel 310 as shown in FIG. 4. The bolt 332 of washer bolt 330 protrudes from the center cap assembly 390 through the center hole 322 the vehicle wheel overlay 320. Then, the washer 360 is placed over the bolt 332 of washer bolt 330. Then the nut 370 is placed over the bolt 332. The washer 360 contacts the center hub 324 of the wheel overlay 320, and the nut 370 is threaded onto the bolt 332, thus compressing the tension washer 340 and securing the wheel overlay 320 to the vehicle wheel 310. Finally a center cap 380 may be affixed to the recessed center 326 of the wheel overlay 320.

Figures 5A, 5B, 5C:
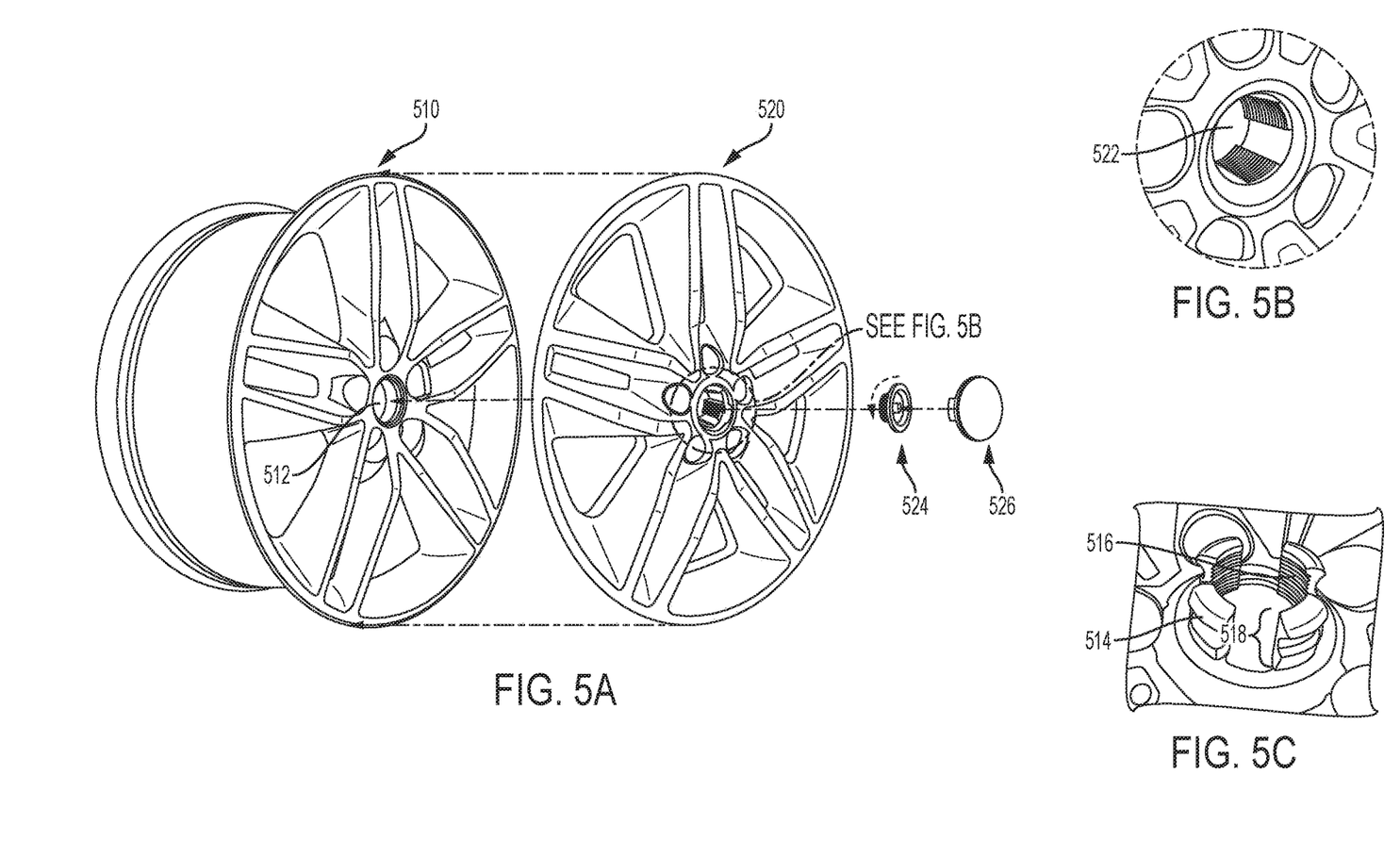
FIG. 5A is an exploded view of how an example wheel overlay with a threaded center retention cap including an original center cap is put together and placed on a an example vehicle wheel, according to an example embodiment of the present disclosure.
FIG. 5B is a zoomed in view of the center portion of FIG. 5A, according to an example embodiment of the present disclosure.
FIG. 5C is a zoomed in view of the backside of FIG. 5B, according to an example embodiment of the present disclosure.

FIG. 5 is an exploded view of how an example wheel overlay with a threaded center retention cap including an original center cap is put together and placed on a an example vehicle wheel, according to an example embodiment of the present disclosure. First, the vehicle wheel overlay 520 corresponding to this embodiment of the vehicle wheel 510 may be placed over the vehicle wheel 510 as illustrated in FIG. 5. The center 522 of the vehicle wheel overlay 520 has threads 516 on legs 514 of length 518 which is determined based on what vehicle wheel the vehicle wheel overlay is made for. The vehicle wheel overlay 520 is inserted into a center recess 512 of the vehicle wheel 510. Then a threaded center retention cap 524 is placed into the center 522 of the vehicle wheel overlay 520 and threaded into threads 516. Finally a center cap 526 may be affixed to the threaded center retention cap 524 of the wheel overlay 520. When the threaded center retention cap 524 is screwed in, it prevents the legs 514 of center 522 from flexing inward, and thus prevents the vehicle wheel overlay 520 from falling off the vehicle wheel 510.

In still other embodiments, other mechanism to attach the wheel overlay may be used in conjunction with the center cap assemblies described herein. Other systems to attach a wheel overlay may include an adhesive strip, a magnet, a screw, a rivet, a bolt, and a clip engaging a portion of the wheel, and may be positioned at various locations on the vehicle wheel or wheel overlay, including but not limited to the lug nuts or lug nut housing, the interior surface of the wheel, the vehicle wheel outer edge, or the wheel spokes. Corresponding engagement areas may be placed on the vehicle wheel overlay to engage additional attachment mechanism positioned on the vehicle wheel.

In various embodiments, the vehicle wheel overlay disclosed herein and designed to engage with the center cap may be formed of plastic, polycarbonate, metal, acrylic, or any other suitable material depending on the aesthetic and durability requirements of the overlay. As described below, the vehicle wheel overlays disclosed herein may be formed of different materials, such as by using a first material for the extensions and a second, different material for the remainder of the body of the vehicle wheel overlay. Other components of the wheel overlay assemblies described herein, such as the center cap, bolt, washer bolt, tension washer, center cap, washer bolt, nut, and center cap, may also be designed from various materials such as metals, plastics, ceramics, or other compounds as manufacturing techniques and durability allow.

In other embodiments, center caps may contain ornamental designs subject to the user's choosing, including manufacturer's logos, and may be styled with any color of the user's choosing. The center cap may be a new center cap. In another example embodiment, the center cap may be the OEM center cap.

In other embodiments, wheel overlays may include additional systems for securing to a vehicle wheel spokes, as disclosed in U.S. Pat. No. 7,452,037, which is incorporated by reference herein. The wheel overlay can be configured to include any number of extensions to perform such engagement. The size, shape, and number of wheel spokes can be used to choose the configuration and shape of the extensions. In such embodiments, each wheel spoke has at least one slot completely through the spoke extending from the spoke's outer surface. The slot is configured with the purpose of receiving attachments for the wheel overlay.

In various embodiments, the vehicle wheel overlay disclosed herein and designed to engage with the center cap, may also contain a plurality of lug nut engaging areas which can be can be shaped to engage and mate with any underlying wheel as disclosed in U.S. application Ser. No. 14/559,184, which is incorporated by reference herein. The wheel overlay can be configured to include any number of extensions to perform such engagement. The size, shape, and number of lug nuts can be used to choose the configuration and shape of the extensions. In various embodiments herein, the lug nut engaging areas may comprise a lip configured to engage the lug nut. It should be appreciated that this same structure may in some settings be referred to as a "lug" onto which lug nuts are threaded.

The above description is exemplary of the features of the system disclosed herein. It should be understood that various changes and modifications to the presently disclosed embodiments will be apparent to those skilled in the art. Such changes and modifications may be made without departing from the spirit and scope of the present subject matter and without diminishing its intended advantages. It is therefore intended that such changes and modifications be covered by the appended claims.

The invention is claimed as follows:

1. A vehicle wheel center cap assembly comprising:
a center cap that engages a center recess of a vehicle wheel;
a mechanism for securing a vehicle wheel overlay to the center cap;
wherein the vehicle wheel overlay comprises a plurality of lug nut engaging areas;
wherein the vehicle wheel includes a plurality of recesses into which a lug nut is inserted; and
wherein each lug nut engaging area includes at least one extension configured to engage a portion of a lug nut after the lug nut has been tightened.

2. The center cap assembly of claim 1, wherein the mechanism for securing is selected from a group consisting of a washer bolt, a tension washer, a washer, and a nut.

3. The center cap assembly of claim 1, wherein the vehicle wheel overlay is configured to engage a second center cap.

4. The center cap assembly of claim 3, wherein the second center cap contains at least one ornamental design or is an original equipment manufacturer center cap.

5. The center cap assembly of claim 1, wherein the mechanism for securing the vehicle wheel overlay to the center cap includes at least one selected from a group consisting of an adhesive strip, a magnet, a screw, a rivet, a bolt, and a clip engaging a portion of the wheel.

6. The center cap assembly of claim 1 wherein the center cap has threads in the center, and the mechanism for securing a vehicle wheel overlay to the center cap is configured to engage a portion of the threads in the center cap and a portion of the vehicle wheel overlay.

7. The vehicle wheel center cap assembly of claim 1 wherein the plurality of lug nut engaging areas are selected from the group consisting of at least: rounded, angled and wedge-shaped.

8. A vehicle wheel overlay attachment system comprising:
a vehicle wheel overlay having:
a shape corresponding to a shape of a vehicle wheel, wherein the vehicle wheel has a center recess;
a plurality of lug nut engaging areas;
a center cap engaging area corresponding to the center recess of the vehicle wheel;
a center cap that engages the center cap engaging area of the vehicle wheel overlay; and
a mechanism for securing a vehicle wheel overlay to the center cap;
wherein the vehicle wheel overlay comprises a plurality of lug nut engaging areas;
wherein the vehicle wheel includes a plurality of recesses into which a lug nut is inserted; and
wherein each lug nut engaging area includes at least one extension configured to engage a portion of a lug nut after the lug nut has been tightened.

9. The vehicle wheel overlay attachment system of claim 8, wherein the mechanism for securing a vehicle wheel overlay to the center cap is selected from a group consisting of a screw, a rivet, and a bolt.

10. The vehicle wheel overlay attachment system of claim 8 wherein the center cap has threads in the center, and the mechanism for securing a vehicle wheel overlay to the center cap is configured to engage a portion of the threads in the center cap and a portion of the vehicle wheel overlay.

11. The vehicle wheel overlay attachment system of claim 10, wherein the vehicle wheel overlay includes at least one additional mechanism for securing the vehicle wheel overlay to the vehicle wheel.

12. The vehicle wheel overlay attachment system of claim 11, wherein the additional mechanism for securing the vehicle wheel overlay to the vehicle wheel is a plurality of mushroom head studs;
wherein the mushroom head studs are integrally formed with the wheel overlay,
wherein the vehicle wheel has a plurality of spokes and the spokes have at least one spoke, and wherein the mushroom head studs are positioned to penetrate the at least one slot in each spoke, and wherein the mushroom head studs engage the at least one slot in each spoke to attach the vehicle wheel overlay to the vehicle wheel.

13. The vehicle wheel overlay of claim 10, wherein the vehicle wheel overlay includes at least one ornamental feature.

14. The vehicle wheel overlay of claim 10, wherein the vehicle wheel overlay is made of a material selected from the group consisting of: plastic polycarbonate, metal, and acrylic.

15. The vehicle wheel overlay attachment system of claim 8 wherein the plurality of lug nut engaging areas are selected from the group consisting of at least: rounded, angled and wedge-shaped.

16. A vehicle wheel overlay comprising:
a body with a shape corresponding to a shape of a vehicle wheel; and
a plurality of lug nut engaging areas;
wherein the vehicle wheel includes a plurality of recesses into which a lug nut is inserted;
wherein the plurality of lug nut engaging areas secure the vehicle wheel overlay to the vehicle wheel;
wherein each lug nut engaging area includes at least one extension configured to engage a portion of a lug nut after the lug nut has been tightened.

17. The vehicle wheel overlay of claim 16, wherein the plurality of lug nut engaging areas for engaging with and disengaging from a corresponding lug nut are selected from the group consisting of at least: rounded, angled and wedge-shaped.

* * * * *